(12) United States Patent
Ingram

(10) Patent No.: US 10,001,299 B2
(45) Date of Patent: Jun. 19, 2018

(54) BLACKBODY THERMAL RECEIVER FOR SOLAR CONCENTRATORS

(71) Applicant: Focal Line Solar LLC, Poplarville, MS (US)

(72) Inventor: John C. Ingram, Poplarville, MS (US)

(73) Assignee: Focal Line Solar LLC, Poplarville, MS (US)

( * ) Notice: Subject to any disclaimer, the term of this patent is extended or adjusted under 35 U.S.C. 154(b) by 118 days.

(21) Appl. No.: 15/007,109

(22) Filed: Jan. 26, 2016

(65) Prior Publication Data

US 2017/0211848 A1    Jul. 27, 2017

(51) Int. Cl.
| | |
|---|---|
| F24J 2/24 | (2006.01) |
| F24J 2/51 | (2006.01) |
| F24J 2/07 | (2006.01) |
| F24J 2/10 | (2006.01) |
| F24J 2/14 | (2006.01) |
| F24J 2/18 | (2006.01) |
| F24J 2/48 | (2006.01) |
| H02S 40/44 | (2014.01) |
| F24J 2/46 | (2006.01) |

(52) U.S. Cl.
CPC . *F24J 2/51* (2013.01); *F24J 2/07* (2013.01); *F24J 2/10* (2013.01); *F24J 2/14* (2013.01); *F24J 2/18* (2013.01); *F24J 2/485* (2013.01); *H02S 40/44* (2014.12); *F24J 2002/4603* (2013.01); *Y02E 10/41* (2013.01); *Y02E 10/45* (2013.01)

(58) Field of Classification Search
CPC ..................................... H02S 40/44; F24J 2/51
USPC .......................... 126/648, 684–971, 651–677
See application file for complete search history.

(56) References Cited

U.S. PATENT DOCUMENTS

| | | | |
|---|---|---|---|
| 1,661,473 A | 3/1928 | Goddard et al. | |
| 4,084,579 A * | 4/1978 | Yu | F24J 2/265 126/659 |
| 4,178,913 A | 12/1979 | Hutchinson | |
| 4,204,522 A * | 5/1980 | Wilson | F24J 2/265 126/660 |
| 4,306,540 A | 12/1981 | Hutchinson | |
| 4,392,008 A * | 7/1983 | Cullis | F24J 2/242 126/569 |
| 5,404,723 A | 4/1995 | Parker et al. | |
| 6,051,775 A * | 4/2000 | Brown | B64G 1/222 136/245 |
| 8,347,877 B2 * | 1/2013 | Shabtay | F24J 2/245 126/600 |
| 2010/0223925 A1 * | 9/2010 | Masada | F24J 2/07 60/641.8 |

* cited by examiner

*Primary Examiner* — Vivek Shirsat
(74) *Attorney, Agent, or Firm* — Sheppard Mullin Richter & Hampton

(57) ABSTRACT

To overcome shortcomings of the conventional thermal receiver, embodiments of the technology disclosed herein are directed towards an improved thermal receiver. More particularly, the various embodiments of the technology disclosed herein relate to thermal receivers without a vacuum insulation, otherwise known as an approximation of a blackbody. Various embodiments of the technology disclosed herein enable greater absorption of sunlight collected by a parabolic solar trough concentrator compared with conventional thermal receivers.

18 Claims, 9 Drawing Sheets

US 10,001,299 B2

BLACKBODY THERMAL RECEIVER FOR SOLAR CONCENTRATORS

TECHNICAL FIELD

The disclosed technology relates generally to thermal receivers, and more particularly, some embodiments relate to blackbody thermal receivers for solar concentrators.

DESCRIPTION OF THE RELATED ART

In trough solar thermal concentrators, sunlight is concentrated by mirrors or lenses on a thermal receiver. Conventional thermal receivers comprise a metal tube disposed within a glass tube, where the space (or annulus) between the metal tube and glass tube is evacuated to create a vacuum of desirably less than 10 milli-Torr. The concentrated sunlight strikes the metal tube, heating up a transfer fluid flowing through the metal tube, thereby converting the solar energy into thermal energy, which can be used for a myriad of purposes from steam generation to indirect power generation.

BRIEF SUMMARY OF EMBODIMENTS

According to various embodiments of the disclosed technology, a multi-internal reflection vacuumless solar receiver (MIRVSR) sometime referred to as a blackbody receiver is provided for use in solar energy applications. Unlike traditional solar thermal receivers, the MIRVSR does not require a vacuum for insulation, and because the hot surface is internal and there is only a small opening for heat loss, it is an approximation of a blackbody. The MIRVSR comprises a plurality of fluid tubes, arranged in parallel. In some embodiments, each fluid tube may define a fluid channel, while in other embodiments the fluid tubes may include one or more openings such that a fluid channel may be defined by more than one fluid tube. The sunlight receiving surface of the MIRVSR is within an internal cavity of the MIRVSR, the internal cavity defined by the plurality of fluid tubes and a set of sidewalls connected to each peripheral fluid tube of the plurality of fluid tubes, and an aperture. In some embodiments, a glass barrier may cover the aperture such that air or wind cannot enter the internal cavity. A selective absorption coating is disposed on the surface of the sunlight receiving inside of the MIRVSR. In various embodiments, a plurality of internal deflectors are disposed on the sunlight receiving side of the fluid tubes, and covered with the selective absorption coating as well. An insulation layer may be disposed on a non-receiving outside of the MIRVSR, the insulation layer having a first end and a second end and extending below a bottom edge of each side wall. In various embodiments, one or more wings may be connected to the first and second end of the insulation layer to reduce forced air crossing the aperture. Secondary reflectors may be disposed below the aperture to direct sunlight into the internal cavity.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
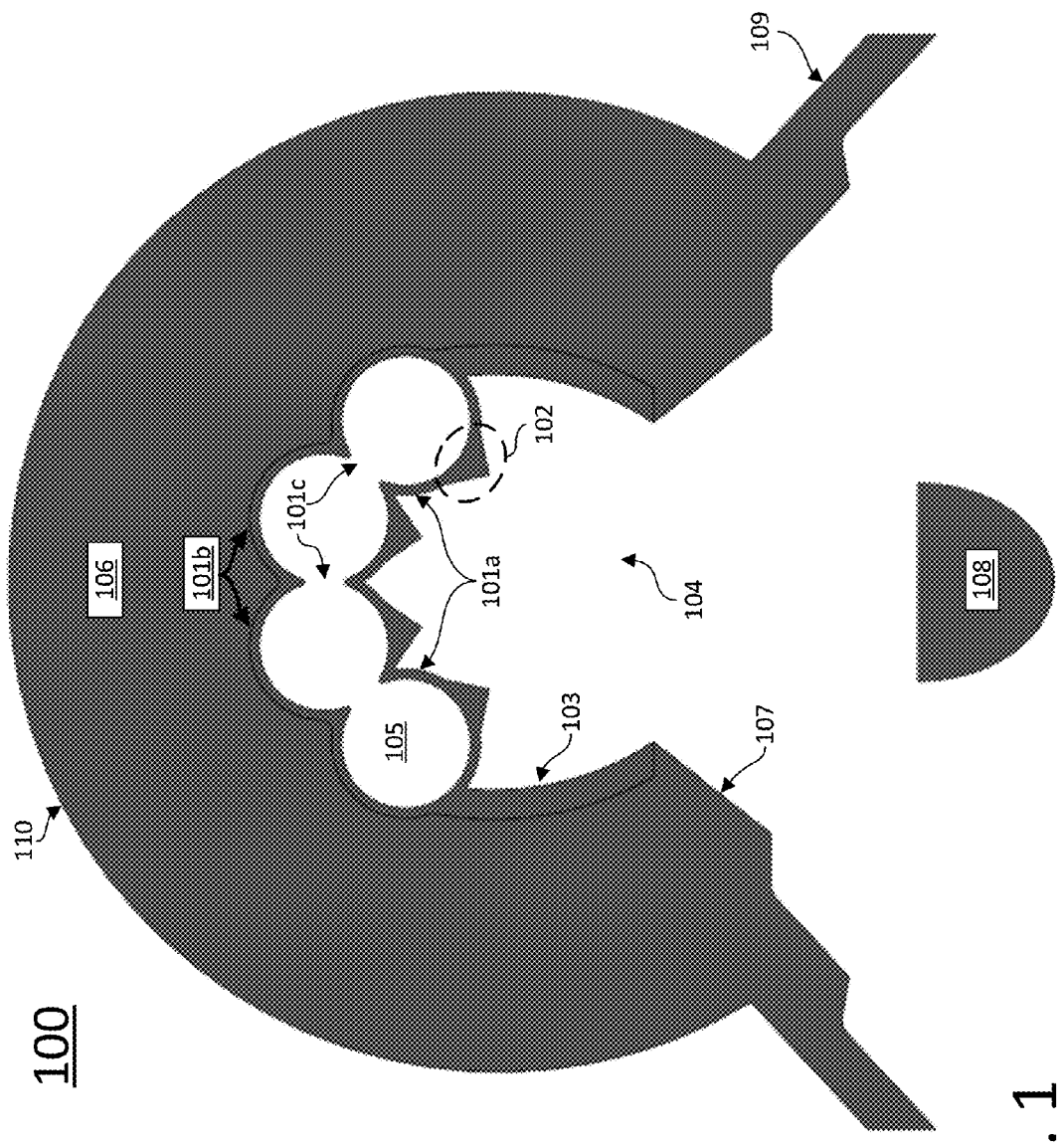
FIG. 1 illustrates a cross-sectional view of an example multi-internal reflection vacuumless solar receiver (MIRVSR) in accordance with embodiments of the technology disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Parabolic trough solar thermal concentrators collect solar power by using mirrors and/or lenses to concentrate a large area of sunlight onto a small area, and from there harnessing the thermal energy from the sun. A thermal receiver, disposed at or near the focal point of the parabolic trough solar concentrator, is designed to collect the solar energy and convert it into thermal energy. The heat is used for hundreds of industrial process, either directly or converted to steam for further use.

Conventional thermal receivers comprise a metal tube disposed within a glass tube, where the space (or annulus) between the metal tube and glass tube is evacuated to create a vacuum of desirably less than 10 milli-Torr. However, conventional thermal receiver designs have several shortcomings. Conventional receivers are fragile and due to thermal stress, suffer high breakage and maintenance rates.

Thermal stress causes breaks within the receiver components, particularly the glass envelope, requiring continuous repairs and/or swapping out thermal receivers, raising maintenance and operation costs. Further, the glass enclosure and the metal tube of the conventional thermal receiver each have significantly different expansion coefficients, resulting in significant difference in expansion experienced by both materials during the large temperature swings from cold to hot this is compensated for by inclusion of a metal bellows flex section in-line with the metal tube. This solves the problem but adds to the cost and reduces the efficiency.

Moreover, the need for the vacuum space in the annulus raises additional drawbacks in conventional designs. The vacuum space serves to minimize heat losses due to convection cooling within the space. However, in practice the vacuum is compromised in several ways. The heat transfer medium within the metal tube is generally a type of oil or synthetic hydrocarbon. As the medium is heated, hydrogen is released and due to its small size, it migrates through the metal tube into the vacuum of the annular space. Hydrogen is a highly effective conductor in convective heat transfer, so as it collects within the annulus the accumulated hydrogen increases the heat losses of the thermal receiver. To overcome this problem conventional receiver include Hydrogen getters in the vacuum space. To further compound the problem, atmospheric helium, also a highly effective convective heat transfer medium, is seeking equilibrium and thus permeates into the annulus through the heated glass enclosure, compounding the impact on convective heat transfer and further increasing the pressure within the annulus. Even at only 1 Torr, hydrogen and helium provide very significant heat transfer in vacuum receivers.

To overcome these (and other) shortcomings of the conventional thermal receiver, embodiments of the technology disclosed herein are directed towards an improved thermal receiver. More particularly, the various embodiments of the technology disclosed herein, also referred to as an approximation of a blackbody, relate to thermal receivers without a vacuum insulation. The lack of vacuum means that neither Hydrogen nor Helium can accumulate as atmospheric air is present in free exchange near the receiver. The approximated blackbody receiver most certainly has higher convective losses than the state of the art vacuum insulated receivers. The higher convective losses of the blackbody receiver are compensated by the 3 factors; 1) that there is no glass to block (reflect) part of the incoming solar, typically 5 to 7% and greater at high incident angles; 2) the much greater absorption converts more of the solar energy to heat; and 3) the blackbody receiver has far lower radiative heat losses due to the narrow aperture and the partial internal reflection and reabsorption. These primary factors help to balance the net energy collected compared to the state of the art vacuum tube receiver and in many cases make the MIRVSR blackbody receiver more efficient than the state of the art vacuum tube receiver.

FIG. 1 shows a cross-section view of an example multi-internal reflection vacuumless solar receiver (MIRVSR) 100 in accordance with embodiments of the technology of the present disclosure. The example MIRVSR 100 includes an internal receiver component comprising a plurality of fluid tubes 101a, 101b, sidewalls 103, and internal deflector 102. In various embodiments, the plurality of fluid tubes may include peripheral fluid tubes 101a and interior fluid tubes 101b. Peripheral fluid tubes 101a represent the fluid tubes disposed on each end of the parallel-disposed plurality of fluid tubes. The interior fluid tubes 101b include all the fluid tubes disposed in between the peripheral tubes 101a. The number of interior fluid tubes 101b may vary depending on the implementation. In the illustrated example of FIG. 1, the example internal receiver component includes two interior fluid tubes 101b and two peripheral fluid tubes 101a, resulting in four fluid tubes comprising the plurality of fluid tubes. Other embodiments may include a greater number of interior fluid tubes 101b, and other embodiments may include a lesser number of interior fluid tubes 101b.

One or more of the plurality of fluid tubes 101a, 101b are configured to form a flow channel 105. When installed on a parabolic trough solar concentrator, the flow channel 105 enables a heat transfer medium to flow through the MIRVSR 100. As the heat transfer medium is pumped through one or more serially connected MIRVSR 100, the temperature of the heat transfer medium increases as it absorbs the thermal energy of the concentrated sunlight. As illustrated in FIG. 1, the plurality of fluid tubes 101a, 101b are placed in parallel with at least one opening 101c allowing fluid to travel from one fluid tube to another.

In other embodiments, the plurality of fluid tubes 101a, 101b may be configured to create a different number of flow channels 105. Non-limiting examples of factors that impact the number of flow channels 105 include: scale size of the MIRVSR 100; desired flow rate for the heat transfer medium; operating pressure of the design; concentration ratio of the collector; or desired absorption surface area of the sunlight-receiving side of the fluid tubes 101a, 101b, sidewalls 103, and internal deflectors 102. In other embodiments, other factors may be accounted for in determining the number of flow channels 105 to include in the internal receiver component. By increasing the number of, but decreasing the size of, flow channels 105 formed by the plurality of fluid tubes 101a, 101b, it is possible to achieve more even heat absorption by the heat transfer fluid flowing through the flow channels 105. In this way, embodiments of the technology disclosed herein enable better control over the flow adjacent to the absorption surfaces.

Figure 5:
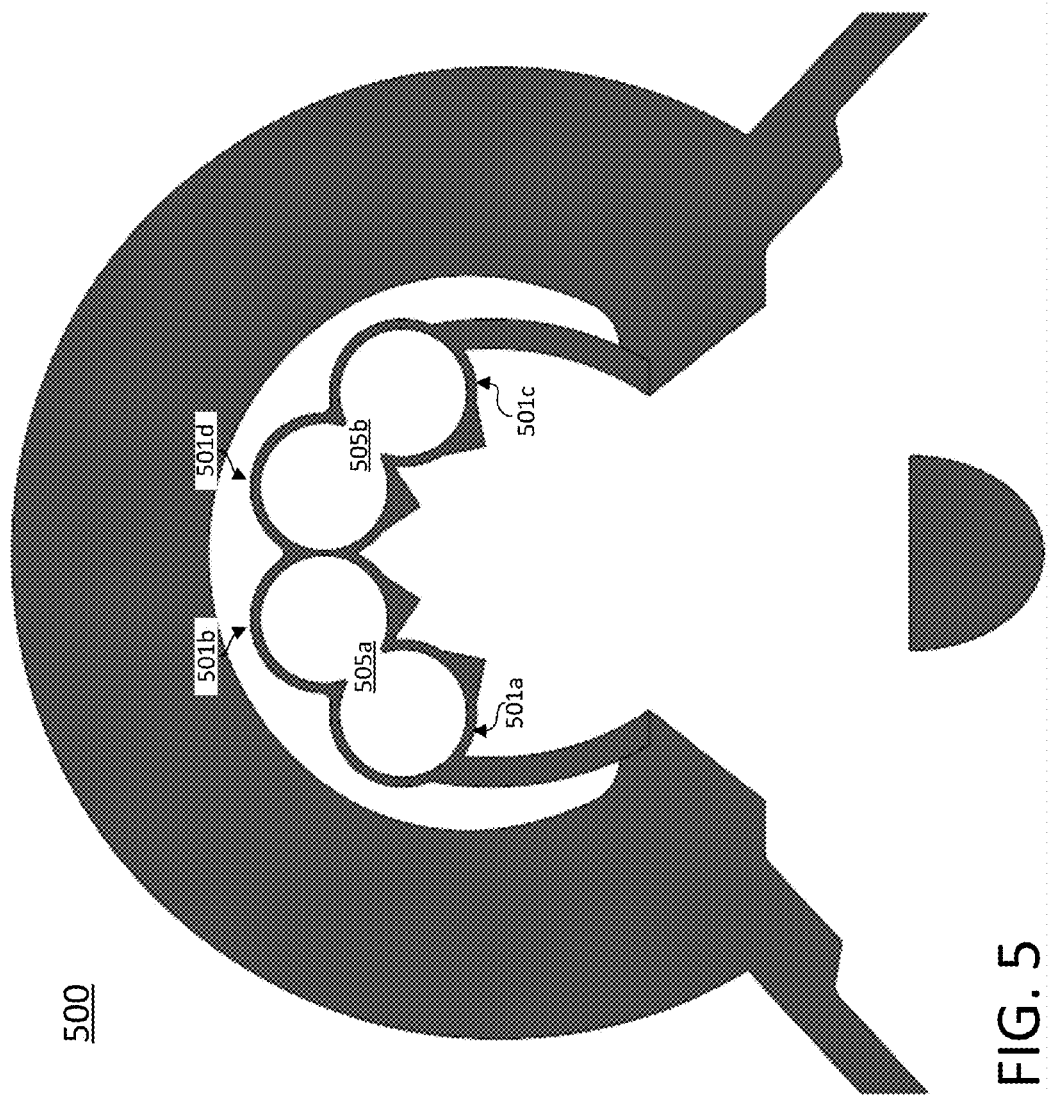
FIG. 5 illustrates a cross-sectional view of another example MIRVSR in accordance with embodiments of the technology disclosed herein.

FIG. 5 illustrates an example MIRVSR 500 in accordance with embodiments of the technology of the present disclosure. The MIRVSR 500 includes two flow channels 505a, 505b. Flow channel 505a is formed by a first peripheral fluid tube 501a and a first interior fluid tube 501b, and flow channel 505b is formed by a first peripheral fluid tube 501c and a first interior fluid tube 501d. As opposed to the illustrated example of FIG. 1, there is no opening between the interior fluid tubes 501b, 501d, defining a separation between the first flow channel 505a and the second flow channel 505b.

Figure 6:
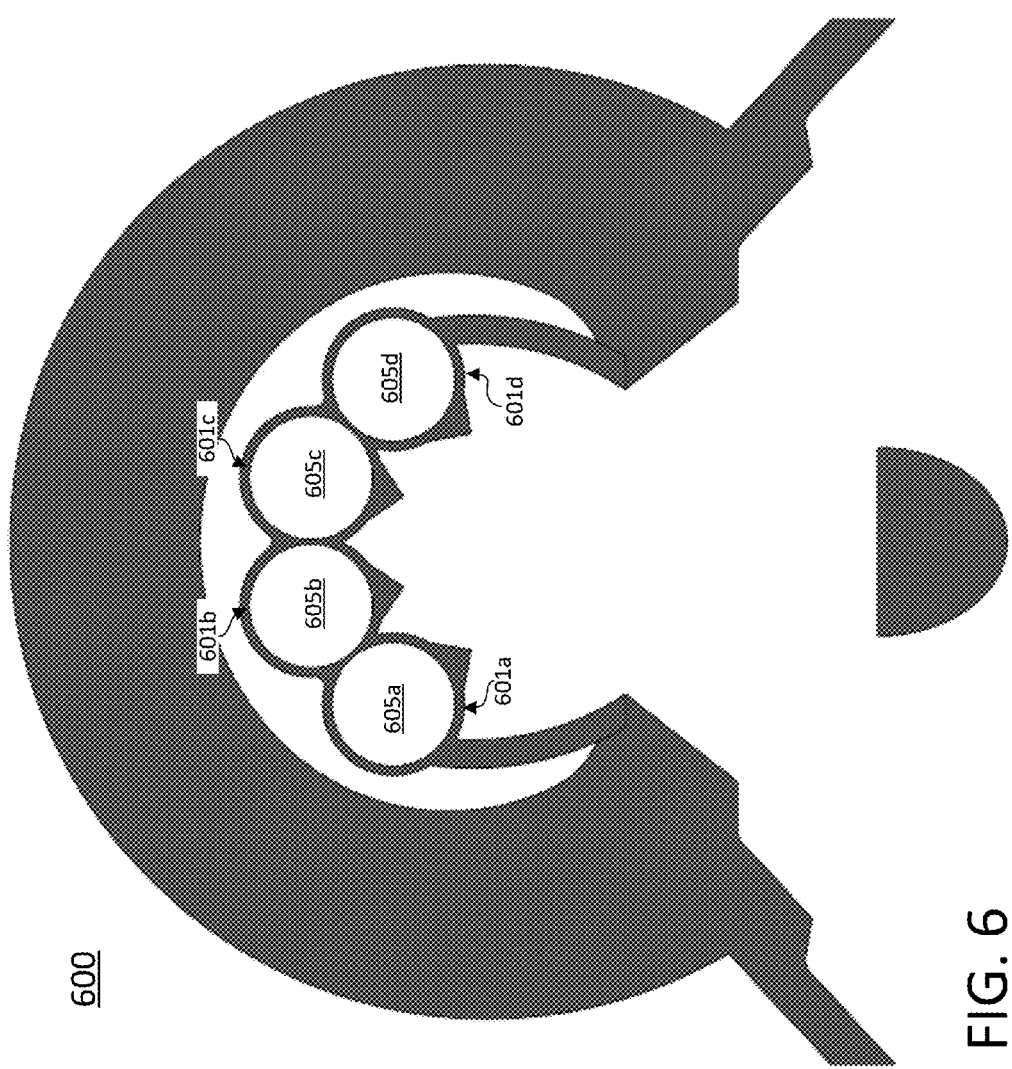
FIG. 6 illustrates a cross-sectional view of another example MIRVSR in accordance with embodiments of the technology disclosed herein.

FIG. 6 illustrates another example MIRVSR 600 in accordance with embodiments of the technology of the present disclosure. The MIRVSR 600 includes four flow channels 605a, 605b, 605c, 605d. Each flow channel 605a, 605b, 605c, 605d is formed by a respective fluid tube 601a, 601b, 601c, 601d. As opposed to the illustrated example of FIG. 1, there is no opening between any of the fluid tubes 601a, 601b, 601c, 601d, defining independent flow channels for each fluid tube.

Referring back to FIG. 1, the internal receiver component includes four fluid tubes 101a, 101b, but various embodiments may include greater or fewer numbers of fluid tubes 101a, 101b, depending on the implemented design. For example, in some embodiments each fluid tube 101a, 101b may have a smaller diameter to allow for a greater number of fluid tubes to be included within the same form factor as the illustrated example of FIG. 1. In other embodiments, the internal receiver component may be larger to include additional interior fluid tubes 101b. The greater size of the internal receiver component, the larger the area of the sunlight receiving surface covering the inside surface of the interior cavity.

The sidewalls 103 help define the internal cavity of the MIRVSR 100. In various embodiments, an interior surface of each side wall 103 may be configured to face the interior cavity of the internal receiver component, where an upper edge of each side wall 103 is connected to the respective peripheral fluid tube 101a. In various embodiments, the bottom edges of the sidewalls 103 defines the size of the aperture 104 of the internal receiver component. The aperture 104 is an opening in the internal receiver component enabling the rays of concentrated sunlight to enter the internal cavity of the internal receiver component. The size of the aperture 104 may be configured such that it is a fraction of the absorption cross-section length of the elements comprising the fluid tubes, internal deflectors and sidewalls, all with a selective absorption surface. In various embodiments, the aperture 104 may have a width that is 25% more or less of the absorption cross-section length.

A plurality of internal deflectors 102 may be disposed on the sunlight-receiving surface of the fluid tubes 101a, 101b. Since no surface is a perfect absorber, so some small percentage of rays of sunlight will not be absorbed by the sunlight-receiving side of the fluid tubes 101a, 101b and the sidewalls 103 on first impact. Therefore, some rays of sunlight will be reflected back off any surface they strike instead of being absorbed, reducing the efficiency of the any absorbing surface. The plurality of internal deflectors 102, together with other internal geometry, enable control over the direction of unabsorbed rays of sunlight. In various embodiments, the internal reflectors 102 may be triangular cross-section components attached to the bottom of each fluid tube 101a, 101b, configured to redirect unabsorbed rays of sunlight such that the rays impact another location in the interior cavity, as opposed to being reflected out of the interior cavity through the aperture 104. In other embodiments, the internal deflectors 102 may have a different cross-sectional shape. In some embodiments, the internal deflectors 102 may be connected to the fluid tubes 101a, 101b through a connecting means, such as by bonding, welding, or brazing. In other embodiments, the internal deflectors 102 may be formed integral to the outside face of each fluid tube 101a, 101b such that the internal deflectors 102 and the fluid tubes 101a, 101b comprises a unitary structure.

The plurality of fluid tubes 101a, 101b, the sidewalls 103, and the internal deflectors 102 may be comprised of one or more of: steel alloy; stainless steel; copper; copper alloys; titanium; or aluminum. In various embodiments, the plurality of fluid tubes 101a, 101b, the sidewalls 103, and the internal deflectors 102 may comprise the same material, or each component may comprise a different material. The internal receiver component including the plurality of fluid tubes 101a, 101b, the sidewalls 103, and the internal deflectors 102 may be constructed in some embodiments as a single, unitary structure. In various embodiments, the fluid tubes 101a, 101b and the internal deflectors 102 may be manufactured as a single component through extrusion, roll forming, or other means and sidewalls 103 may be manufactured separately through extrusion or roll forming. In other embodiments, each component may be manufactured independently by extrusion, roll forming, or pultrusion and connected to form the internal receiver component by welding or brazing.

Figure 2:
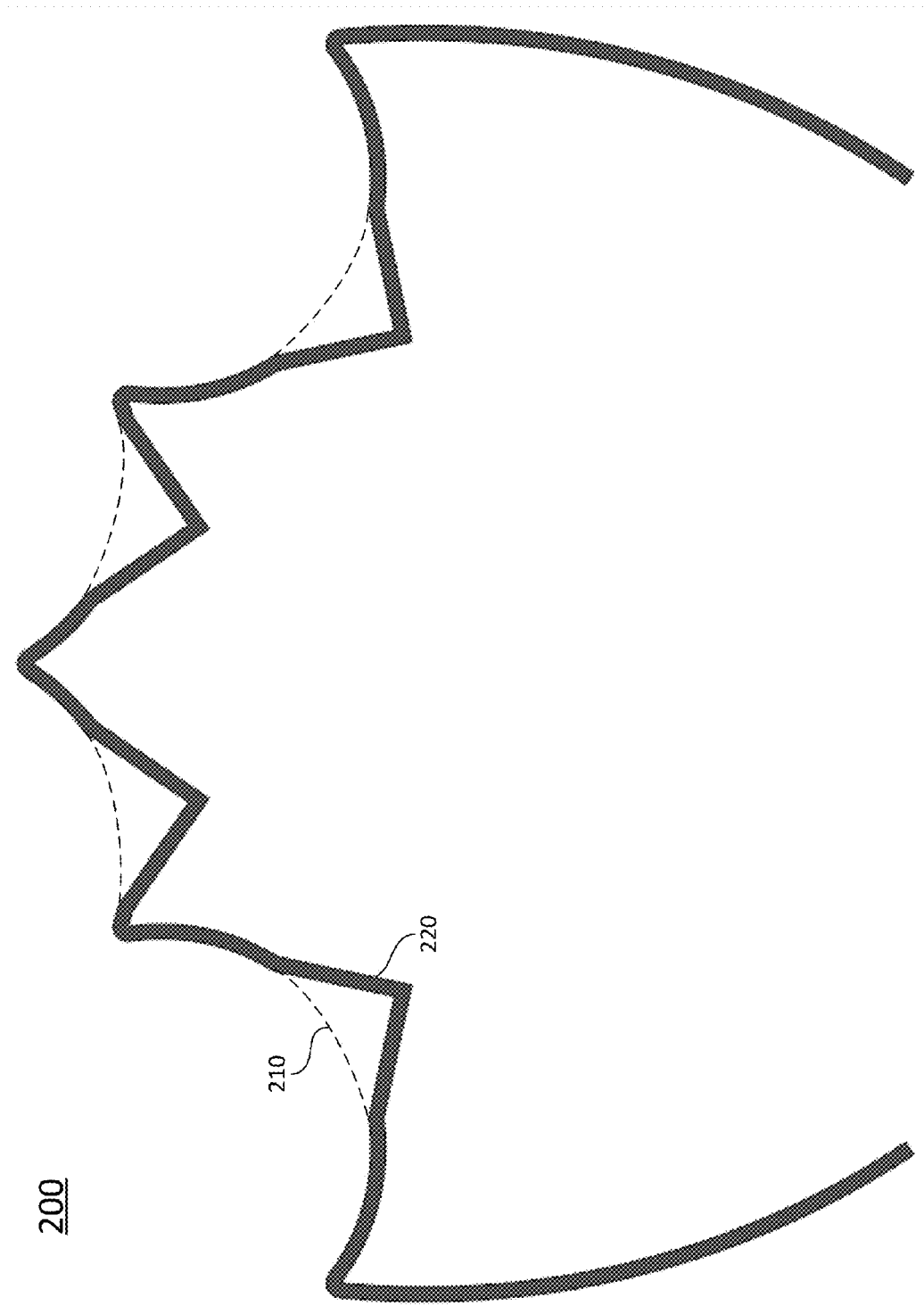
FIG. 2 shows an example sunlight receiving area of an internal cavity of a MIRVSR in accordance with embodiments of the technology disclosed herein.

By implementing the internal deflectors and the shape of the internal cavity, losses may be reduced as a greater amount of concentrated sunlight is absorbed by the internal receiver component, due to multiple opportunities to be absorbed. Embodiments in accordance with the technology disclosed here are capable of absorbing a greater amount of solar energy than conventional thermal receivers. The sunlight receiving area 200 of the example MIRVSR in accordance with embodiments of the technology disclosed herein is illustrated in FIG. 2. The sunlight receiving area 200 comprises the surfaces of the components of the internal receiver component (i.e., the plurality of fluid tubes, sidewalls, and internal deflectors). For example, the sunlight receiving area 200 comprises the bottom surface of the fluid tube 201 and the outer surfaces of the internal deflectors 220.

Although the materials comprising the internal receiver component—and by proxy the sunlight receiving area 200—are capable of absorbing solar energy, in various embodiments a selective absorption coating may be layered, deposited, painted, coated or otherwise bonded on the sunlight receiving area 200. There are many common selective absorption coatings available but some are not stable in air and thus are not considered. In various embodiments, the selective absorption coating may include Black Chrome, Black Nickle, or other selective absorption coatings. In various embodiments, the selective absorption coating may be disposed across the entire surface of the sunlight receiving area 200, while in other embodiments the selective absorption coating may be applied to a portion of the sunlight receiving area 200, leaving an uncoated portion of the sunlight receiving area 200.

As discussed above, the internal cavity (illustrated by the sunlight receiving area 200 of FIG. 2) promotes internal reflection of incoming concentration rays of sunlight. By configuring the internal cavity of the MIRVSR such that the aperture is smaller than the width of the internal cavity, a greater percentage of concentrated solar rays may be captured due to the increased opportunity for initially unabsorbed rays to be absorbed on subsequent impacts. The effective absorptivity ($A_e$) of the cavity is $$A_e = A_s \sum_{n=1}^{4} (1 - A_s)^{(n-1)} \cdot I_n, \qquad (1)$$

where $A_s$ is the surface absorptivity (e.g., the absorptivity of the selective absorption coating in normal application) in the range of the solar spectrum, and $I_n$ represents the percent of incident rays of the concentrated sunlight at each impact for the specific cavity geometry.

With n representing the impact number and n=4 is the maximum considered, the percentage of incident rays of successive impacts is shown in Table 1. The percentages $I_n$ identified in the table are determined based on the specific geometry illustrated in FIG. 2, as implemented with a parabolic solar trough concentrator as described in co-pending U.S. patent application Ser. No. 13/673,531, which is hereby incorporated herein by reference in its entirety.

TABLE 1

Percentage of Incident Rays at nth Impact

| Impact Number (nth value) | $I_n$ |
|---|---|
| 1 | 100% |
| 2 | 98.8% |

TABLE 1-continued

Percentage of Incident Rays at nth Impact

| Impact Number (nth value) | $I_n$ |
|---|---|
| 3 | 44.6% |
| 4 | 26.4% |

By definition the percentage of impacting concentrated light entering the chamber is 100% of the rays on the first impact (n=1). As discussed above, no surface is a perfect absorber, meaning that some percentage of rays of concentrated light will not be absorbed on the first impact. Accordingly, some percentage of the incoming rays would be reflected or deflected instead of being absorbed by the material. For n=2 and so on, $I_n$ represents the percentage of light which impacts the sunlight receiving surface again. Obviously, $1-I_n$ is the percent of rays which go out.

As is apparent to one of ordinary skill in the art, the effective absorption of various embodiments of the technology disclosed herein is improved based on construction of the internal receiver category discussed with respect to FIGS. 1 and 2, and applicable to embodiments in accordance with the technology of the present disclosure. For example, assuming the surface coating is Black Chrome, with a fixed surface absorptivity $A_s$=0.94, the effective cavity absorption would be $A_e$=0.997 based on equation (1). It should be noted that in practice the effective cavity absorption would likely be reduced from 99.7% absorption, even though slightly, due to some secondary effects. For example, effective absorption may be slightly impacted by the portion of the rays impacting at acute angles, or may be slightly impacted by normal wear and tear on the device over time. However, as illustrative, using a lower surface absorptivity of $A_s$=0.85, the effective absorptivity would be $A_e$=0.985. The overall increase in effective absorptivity compared to surface absorptivity is due to the extra opportunity for absorption of light rays not absorbed upon first impact to be later absorbed, including those rays that make only glancing impacts due to incoming acute angles, which are irrecoverably lost in conventional thermal receivers.

Even though light rarely strikes the receiver of a parabolic collector at perpendicular angles, Equation (1) is suitable for calculating the effective absorption coefficient for angles less than 30 degrees from normal. However, in the annual cycle, there are still significant amounts of time where the incident angle is great enough to causes increased reflective losses and contributes significantly to a quantifiable loss. The loss has been shown to be a function of the incident angle. The reflective loss has been shown to be a function of the incident angle. To account for such effect, Equation (1) may be modified through inclusion of an Incident Angle Modifier (IAM) (not including cosine effects) as shown in Equation (2):

$$A_e = IAM \cdot A_s \sum_{n=1}^{4} (1 - IAM \cdot A_s)^{(n-1)} \cdot I_n, \quad (2)$$

Consider an IAM of 0.80, which is reasonable at certain operation times for parabolic troughs. Ignoring the Cosine effect because we want the effective absorption at any given angle regardless of power, the effective absorption of a state of the art vacuum tube receiver would be 0.94×0.80=75.2%, not considering the increased reflection losses from the glass barrier, which would be considerable. Factoring in glass envelope losses, the total absorption could be as low as 60.2%. In comparison, the effective absorption of the MIRVSR would be 96.0%, by Equation (2). It should be noted that during an annual cycle the total effective absorption would be a weighted average between 99.7% and 96%. Whereas for the conventional vacuum receiver the weighted average would be between 94% and 75.2%, ignoring envelope losses.

Accordingly, MIRVSR in accordance with embodiments of the technology of the present disclosure may sustain overall high total absorption of the receiver over time as the surface properties degrade, either naturally or due to artificial means. Moreover, the range of suitable materials to use as the selective surface coating increases as the natural absorption properties of the material are less critical due to the effectiveness of the receiver geometry, unlike conventional thermal receivers. The net result is that MIRVSR in accordance with the technology of the present disclosure may absorb a larger amount of concentrated sunlight than conventional thermal receivers.

The internal cavity of the MIRVSR discussed with respect to FIGS. 1 and 2, and applicable to embodiments in accordance with the technology of the present disclosure, further reduces heat losses due to infrared (thermal) radiation from the heated receiving surface. Like all materials, the sunlight receiving area of the example MIRVSR radiates some of the heat due to being hotter than the surrounding environment. Due to the geometry of the internal cavity, a portion of the heat radiated off any portion of the sunlight receiving surface will impact another portion of the surface, providing one or more opportunities for the radiated heat to be re-absorbed, similar to the absorption of the solar energy from the impacting concentrated sunlight.

Thermal radiation is one of the primary loss mechanisms for state of the art vacuum receivers. As anyone skilled in the art will know: radiation losses are proportional to the hot surface area that is exposed to a cooler background. As such, in state of the art receivers the entire circumference is radiating to the cooler environment, even though only ⅔ of the circumference is absorbing heat. Consequently, the thermal radiation area is 150% of the solar absorption area, to whit there is 50% more radiation loss area than solar absorption area. Conversely, for the MIRVSR, the absorption and radiation surface areas are the same. However, due to the small aperture and the internal geometry, which effects the view factor, the effective radiation loss area is less than the solar absorption area. Specifically, as mentioned previously, some of the emitted internal radiation is reabsorbed internally and thus effectively reduces radiation losses, i.e. the view factor is less than unity. For the multi internal reflection MIRVSR of FIGS. 1 and 2, for example, with an emissivity of 0.10 the view factor is 0.75. That is, the thermal radiation area is effectively only 75% of the solar absorption area. So, all things being equal, absorption area, temperature and emissivity, the MIRVSR will have ½ the radiation losses of the state of the art receiver.

Referring back to FIG. 1, the internal receiver component may be covered in various embodiments by an insulation layer 106. The insulation layer 106 helps reduce losses of heat radiating off the non-sunlight receiving side of the internal component, as well as reducing forced convection losses due to air passing across the non-sunlight receiving side. Moreover, by adding appropriate coating to the outside surface 110 of the insulation layer 106 some solar energy may be absorbed by outer surface of insulation layer 106 in various embodiments, decreasing the overall heat transferred (loss) from the fluid tubes 101a, 101b. The insulation layer 106 may be one of a number of different materials, including but not limited to: aerogel, nanogel beads, Rockwool, glass beads, microfiber insulation, polyurethane, vermiculite, fiberglass, or other insulation material. Further, given the temperature differential, any of the aforementioned insulation material may or may not be opacified, that is made opaque or otherwise none-transparent to thermal radiation. In various embodiments, the insulation layer 106 may be coated or wrapped with a protective material 110. Non-limiting examples of the protective material 110 may include: aluminum; steel; stainless steel; copper; plastic; composite materials; paint, urethane coating; or Silicon coating. In some embodiments, the protective surface 110 may be painted, anodized, or otherwise coated with an solar absorbent material, selective or otherwise, designed to assist in increasing the solar absorption by increasing the temperature of the insulation layer 106, thereby reducing the delta-T and thus the conductive losses through the insulation 106 of the internal receiver component. The insulation layer 106 may traverse around the internal receiver component, surrounding the non-sunlight receiving side of the internal receiver component, terminating such that the aperture 104 remains uncovered.

A smaller aperture 104 may be accomplished in various embodiments by using secondary reflectors 107. They are referred to as secondary reflectors because they reflect a portion of the light concentrated by the primary mirror. Secondary reflectors 107 may be placed below the sidewalls 103 of the internal receiver component, adjacent to the aperture 104, and configured to direct portions of the concentrated sunlight, from the trough solar concentrator, into the internal cavity through the aperture 104. In various embodiments, the secondary reflectors 107 may be glass or metal mirrors. In various embodiments, the secondary reflectors 107 may be disposed on the insulation layer 106, below the sidewalls 103. In various embodiments, the secondary reflectors 107 may be pitched on an angle. In various embodiments, secondary reflectors 107 may comprise a plurality of mirrors. In some embodiments, each secondary reflectors 107 may comprise one or more facets, each facet pitched to a different angle. In various embodiments, the secondary reflectors 107 may not be contiguous, i.e., the secondary reflectors 107 may be placed along the interior of the MIRVSR at set intervals.

The aperture 104 may be open to the air in various embodiments, i.e. not having a physical cover. Such an example embodiment of the MIRVSR is illustrated in FIG. 1. As no vacuum is required in the MIRVSR, the need for a glass enclosure, like conventional thermal receivers, is not present. The open-air nature of the aperture (and, accordingly, the internal cavity) increases the potential for forced convection losses caused by air passing across the aperture 104 and/or entering the internal cavity through the aperture 104. In various embodiments, wings 109 may be included in the MIRVSR 100. The wings 109 serve to limit air (such as wind) being forced into or across the internal cavity. In various embodiments, the wings 109 may be disposed on either side of the aperture 104. Each wing 109 may be disposed on a given end of the insulation layer 106. That is, the wings 109 may be disposed on a first end of the insulation layer 106 (which terminates at one side of the aperture 104) and a second end of the insulation layer 106 (which terminates at the other side of the aperture 104). In some embodiments, the wings 109 may be tapered, as illustrated in FIG. 1.

To further limit losses by forced convection, some embodiments may include an apex body 108 disposed below the aperture 104. The apex body 108 may alter the flow of any forced air currents, generally limiting the direction and speed of air passing across the aperture 104. In this way, forced convection losses may be further reduced. In various embodiments, a mirror or other reflector surface may be disposed on a top and/or side face of the apex body 108 to further assist in redirecting solar or infrared rays into or back into the cavity. Various embodiments of the apex body 108 may be circular or pyramidal. The faces of the apex element 108 may be convex or concave in various embodiments such as, for example, the apex body of U.S. patent application Ser. No. 13/673,531, mentioned above.

Figure 3:
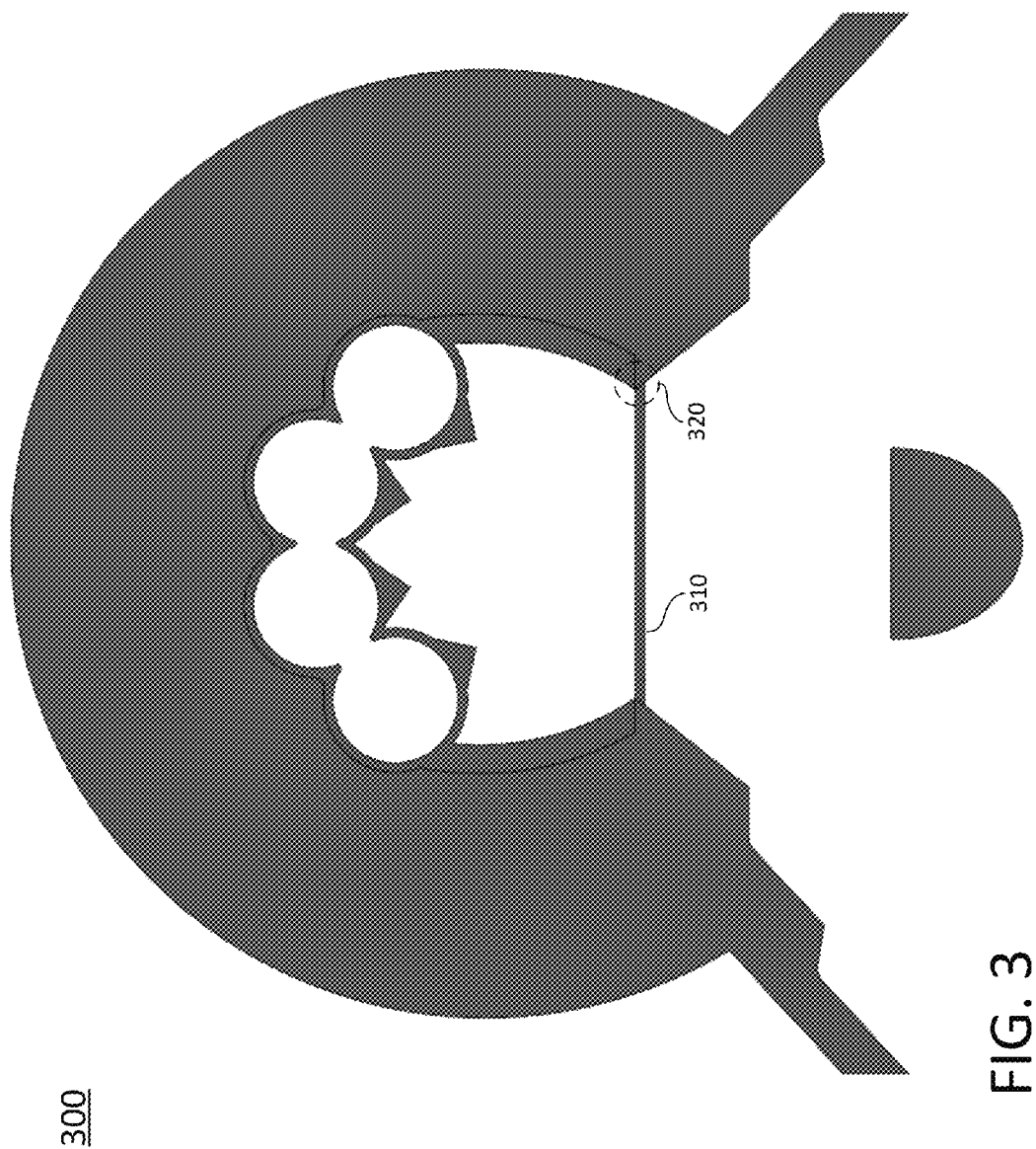
FIG. 3 illustrates a cross-sectional view of another example MIRVSR with a glass barrier in accordance with embodiments of the technology disclosed herein.

The increase in absorbed solar energy and reduction in radiation losses as discussed above with respect to FIGS. 1 and 2 is sufficient to offset most increases in convection heat losses causes by the open-air nature of the internal cavity. However, in various embodiments, the MIRVSR may include a glass barrier spanning the aperture. Such an example MIRVSR 300 in accordance with various embodiments of the technology disclosed herein is illustrated in FIG. 3. As illustrated, a glass barrier 310 may be included to further limit forced air from entering the internal cavity of the internal receiver component. Such embodiments may be useful where trough solar concentrator installations are in high wind environments. A slot or shelf 320 may be disposed on either side of the aperture of MIRVSR 300 and configured to accept the glass 310. In various embodiments, the glass 310 may be bonded to the MIRVSR 300 by an epoxy, silicon or other suitable bonding agent. Although the glass should be sealed sufficiently to reduce dirt or other particulates from entering the internal cavity, the lack of a vacuum eliminates the need for a hard seal and provides greater flexibility than conventional thermal receivers.

Figure 4:
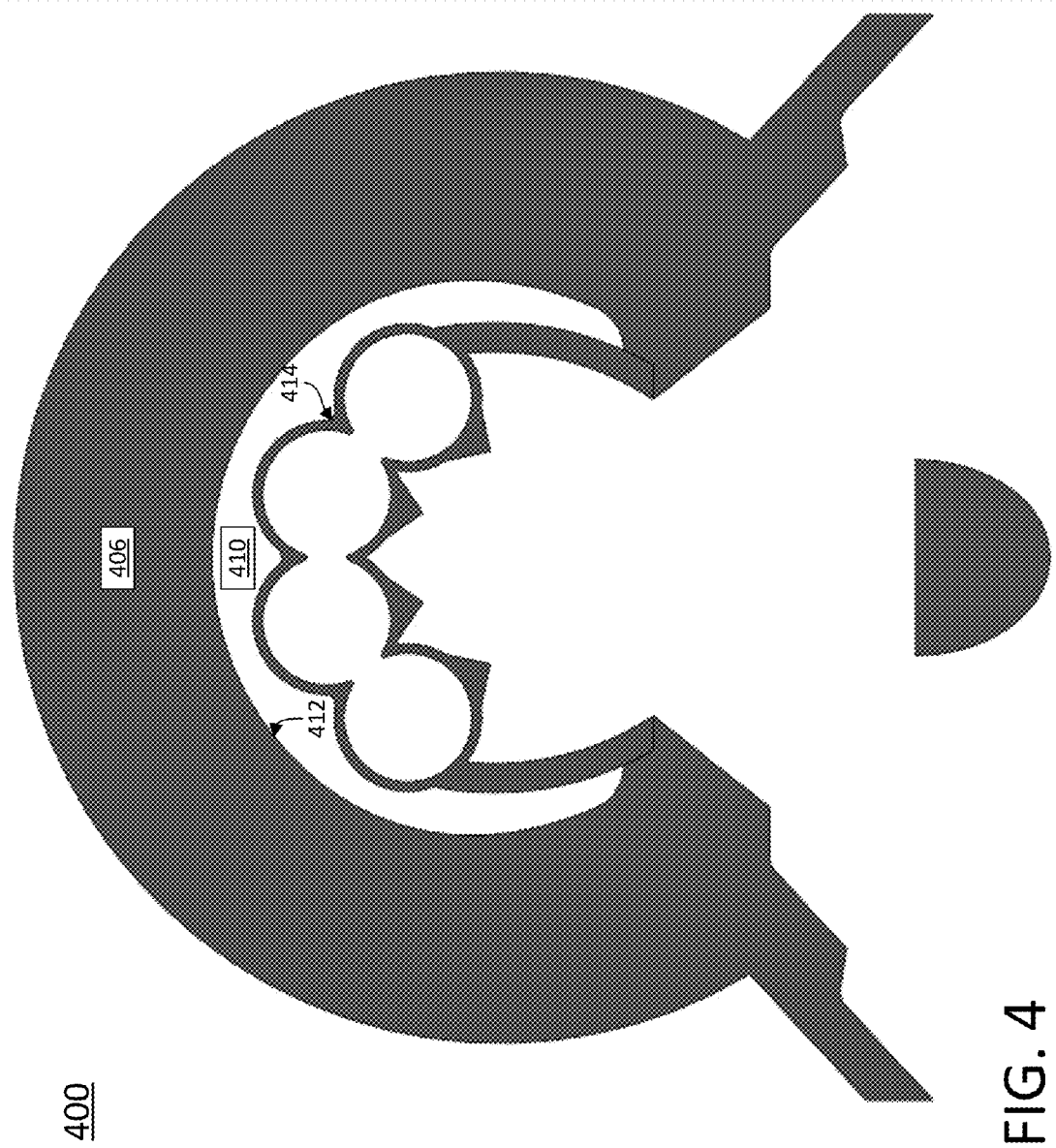
FIG. 4 illustrates a cross-sectional view of another example MIRVSR in accordance with embodiments of the technology disclosed herein.

In some embodiments, it may be desirable to limit heat transfer between the internal receiver component and the insulation layer. FIG. 4 illustrates an example MIRVSR 400 in accordance with embodiments of the technology of the present disclosure. An air gap 410 is disposed near the non-sunlight receiving side of the internal receiver component. The air gap limits the conductive heat transfer to the insulation layer 406. In various embodiments, an intermediate surface 412 may be disposed on the internal face of the insulation layer 406. In other embodiments, the intermediate surface 412 may be disposed on the non-sunlight receiving side 414 of the internal receiver component. Non-limiting examples of intermediate surface 412 include: aluminum; steel; stainless steel; plastic; silicon; or composite materials.

Another drawback of conventional thermal receivers is the need to pump the heat transfer medium through conventional receivers at high velocities to cause turbulent flow in order to improve heat transfer into the fluid. At low velocities, the heat transfer from the walls of the conventional receiver to the medium is poor as there is less turbulence in the fluid flow and thus the boundary layer reaches a much higher temperature than the bulk fluid. Accordingly, the medium closer to the walls of the receiver requires higher and higher wall temperatures to push the heat into the fluid. At the same time, the volume of the heat transfer medium closer to the center of the receiver tube is not well mixed and not effectively absorbing heat. To cause turbulence in the flow and, therefore, improve heat transfer into the medium, conventional thermal receivers operate at high velocities in order to achieve turbulence associated with high Reynolds numbers. Although effective, such high velocity requires large pumping power, which is a significant parasitic load on the system.

Figure 7:
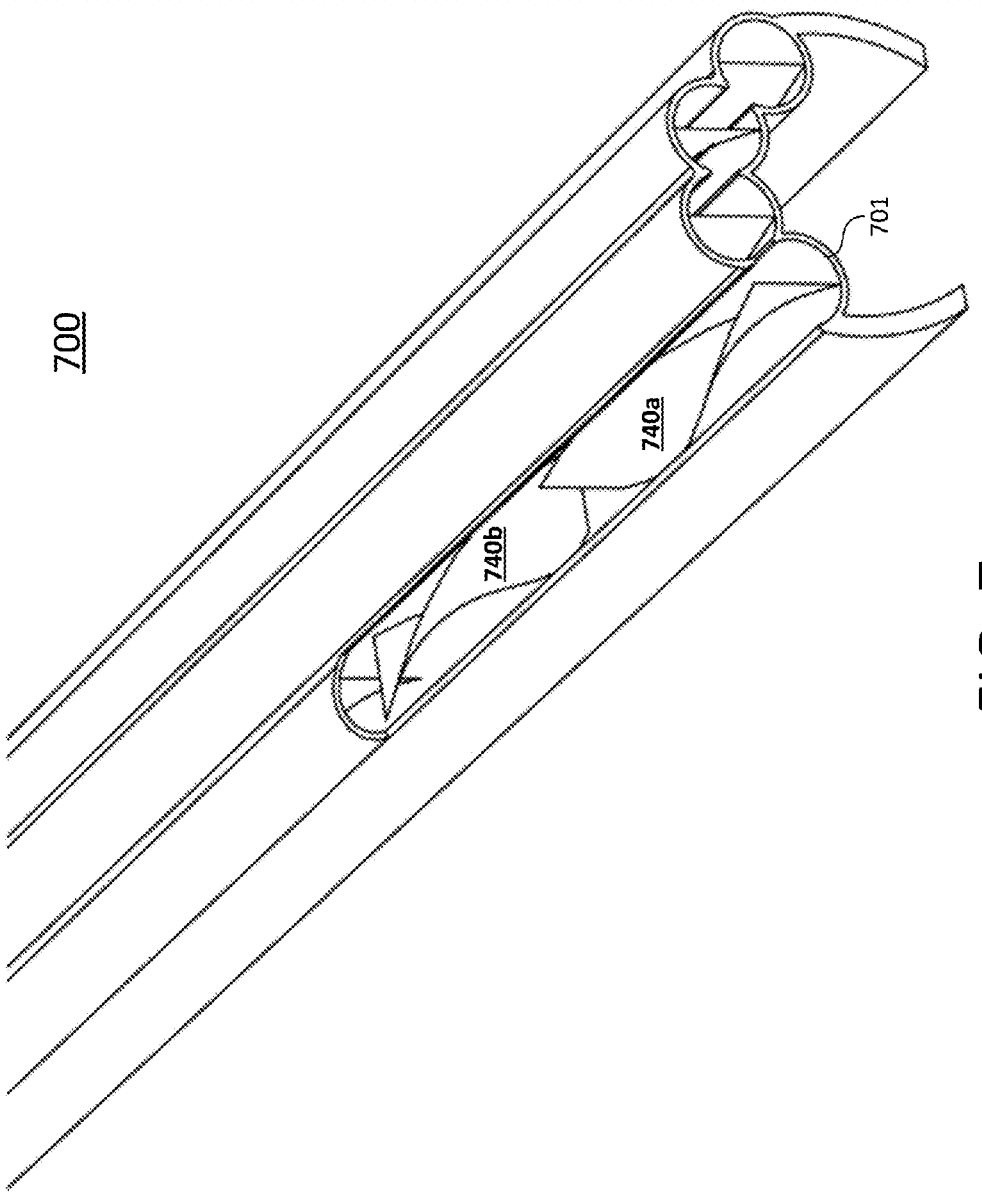
FIG. 7 shows turbulators disposed within a fluid channel of an example MIRVSR in accordance with embodiments of the technology disclosed herein.

FIG. 7 illustrates an example internal receiver component 700 in accordance with embodiments of the technology of the present disclosure. The internal receiver component 700 may be implemented in various embodiments of the MIRVSR, such as the those discussed with respect to FIGS. 1, 3, 4, 5, and 6. For ease of discussion, a first fluid tube 701 of the internal receiver component 700 of FIG. 7 is shown with the top portion of the tube removed, showing the interior of the fluid tube 701. To increase mixing (a substitute for turbulence) of the fluid, the fluid tube 701 includes turbulators 740a, 740b and so on repeating the length of the tube. The turbulators 740a, 740b cause the fluid to spiral at an angle to the general direction of the flow of the heat transfer medium. In various embodiments, the turbulators 740a, 740b may be periodically broken and rotated 90 degrees relative to the previous section, to cause greater mixing. As illustrated in FIG. 7, the second turbulator 740b is offset by 90 degrees to first turbulator 740a. In some embodiments, each subsequent turbulator in the tube may also have a reversed twist relative to the previous turbulator.

By using the turbulators 740a, 740b, the heat transfer medium is swirled and mixed while flowing through the fluid tube 701. Thusly preventing laminar flow, along the heat transfer face, that would otherwise develop at low flow velocities. Accordingly, the need for high velocity fluid flow required to generate turbulence is reduced as the turbulators 740a, 740b cause internal mixing at much lower fluid flow velocity. Therefore, the boundary layer of the heat transfer medium at the fluid tube 701 wall is constantly refreshed by the mixing, allowing for heat transfer medium in contact with the walls of the fluid tube 701 to better absorb heat. This reduces the temperature required for heat transfer into the fluid while reducing the required pumping power because internal mixing is attainable without the need to force the fluid through the receiver at a high velocity.

As can be seen in FIGS. 1 and 3-6, the top surface of the MIRVSR, like the parabolic trough concentrator, faces the sun. Accordingly, the top surface is not involved in collecting the sunlight directed from the concentrator. This configuration of the MIRVSR, however, provides an opportunity to harness direct sunlight in addition to the concentrated sunlight harnessed by the parabolic trough concentrator.

Figure 8A:
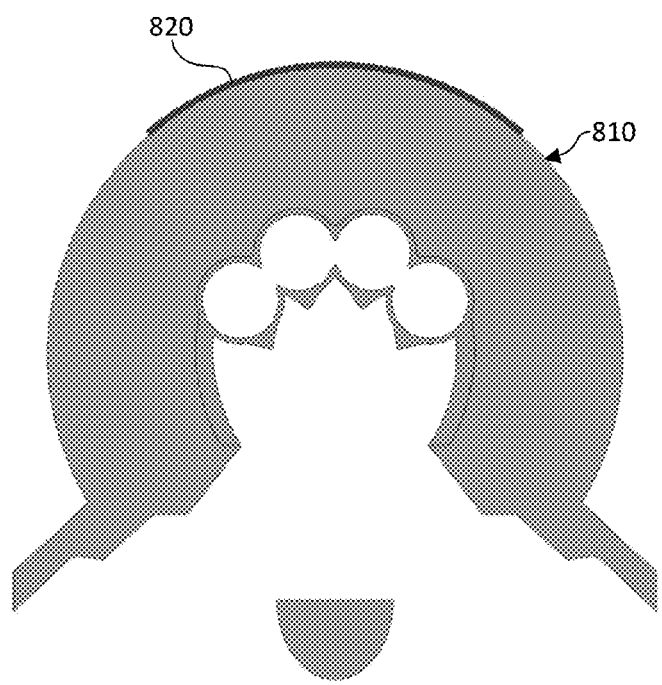
FIG. 8A illustrates a cross-sectional view of an example MIRVSR with a PV cell disposed on a top surface in accordance with embodiments of the technology disclosed herein.

FIG. 8A illustrates an example MIRVSR with photovoltaic cells (PV cells) or an array of cells disposed on the top surface in accordance with embodiments of the technology disclosed herein. In traditional thermal receivers, the outer surface of the glass tube, enveloping the metal fluid-containing tube, has a high temperature. This high temperature renders the top surface (i.e., sun-facing surface) of the traditional vacuum receiver unsuitable for placement of PV cells as the temperature is usually well above the operational temperature range for PV cells. The top surface of the MIRVSR, however, has a much lower temperature than traditional vacuum receivers because of the insulating material.

With reference to FIG. 8A, in various embodiments the top surface 810 of the MIRVSR operates at a temperature similar to the operating temperature of a typical stand-alone PV modules. Accordingly, the MIRVSR in accordance with embodiments of the present disclosure provides the opportunity to dispose PV array 820 on the top surface 810. In this way, the PV array 820 may harness direct sunlight, similar to stand-alone PV modules. In various embodiments, the PV array 820 may comprise a plurality of PV cells disposed along the length of the top surface 810. In such embodiments, each PV cell may be placed in series at periodic intervals in some embodiments, resulting in portions of the top surface 810 remaining exposed to the sun. In some embodiments, the PV array 820 may extend over only a portion of the top surface 810. The size of PV array 820 may be determined based on the design requirements of the system. By disposing the PV array 820 on the top surface 810 of the MIRVSR, no separate frame or back support structures are necessary to support and position the PV array 820. Moreover, by disposing the PV array 820 in such a way, no separate tracking mechanisms are needed for the PV array 820; the tracking motion of the parabolic trough concentrator would ensure that the PV array 820 disposed on the top surface 810 is correctly pointed towards the sun.

In various embodiments, the PV array 820 may be used to power one or more components of the parabolic trough concentrator installation, increasing the efficiency of the system and eliminating the need for distributed power wiring. For example, in some embodiments the PV array 820 may power the electric tracking drive and data acquisition.

Figure 8B:
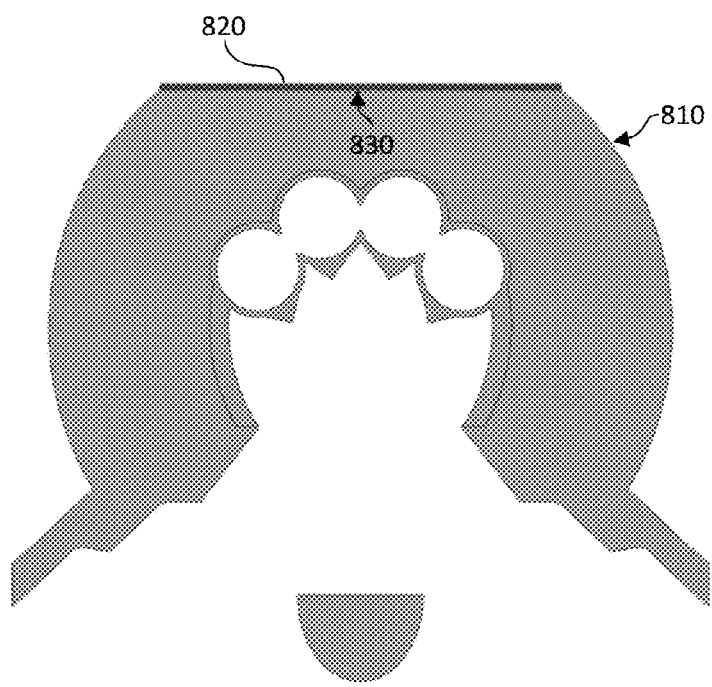
FIG. 8B illustrates a cross-sectional view of another example MIRVSR with a PV cell disposed on a top surface in accordance with embodiments of the technology disclosed herein.

In FIG. 8A, the PV array 820 is illustrated as a flexible amorphous PV array, which may conform to the shape of the top surface 810 of the MIRVSR. Different configurations may be utilized in other embodiments. FIG. 8B illustrates another example MIRVSR in accordance with embodiments of the present disclosure. As illustrated in FIG. 8B, the PV array 820 is disposed on a mounting surface 830. The mounting surface 830 may be a flattened portion of the top surface 810 in various embodiments, where a flat and/or rigid PV array 820 may be disposed.

Figure 9:
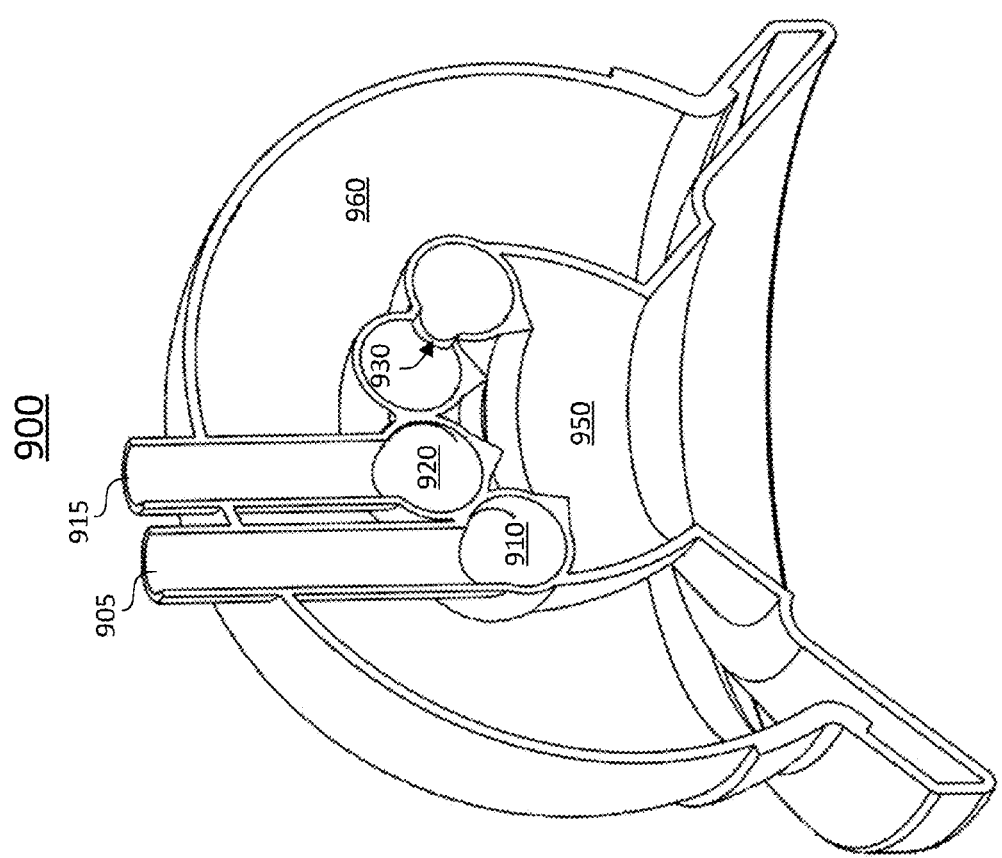
FIG. 9 illustrates a cross-sectional view of an example multi-internal reflection thermal receiver (MIRTR) for use in a point-focused implementation in accordance with embodiments of the technology disclosed herein.

Various embodiments of the technology disclosed herein may be implemented with point-focused solar concentrators, such as solar dishes or tower implementations. For point-focused implementations, FIG. 9 illustrates a cross-sectional view of an example multi-internal reflection point-focus receiver (MIRPR) in accordance with embodiments of the technology disclosed herein. The aforementioned principles, materials, benefits and features of the MIRVSR linear focus implementation apply to the point focus variant.

In state of the art receivers, a main difference between linear focus and point focus variants is the application of vacuums insulation for the receivers. As discussed above, in linear focus implementations (e.g., parabolic trough collectors), the thermal receiver traditionally includes a vacuum between the glass enclosure and the metal absorber tube. For point focus implementations, however, the thermal receiver is predominately vacuumless—the receiving face rarely, if ever, has vacuum insulation sealed with glass over the aperture.

As illustrated in FIG. 9, the example MIRPR 900 includes an internal cavity 950, similar to the internal cavity of the MIRVSR discussed with respect to FIGS. 1-7. The main difference between the internal cavity 950 of the MIRPR 900 and the internal cavity discussed above is that the internal cavity 950 is a bowl-shape, wider inside than on the aperture. Conceptually, the internal cavity 950 may be created by taking the cross-sectional shape of the MIRVSR discussed with respect to FIGS. 1 and 2, and rotating the cross-section around a central axis. Various embodiments of the MIRPR 900 may include many of the same features and components discussed above with respect to FIGS. 1-7. A person of ordinary skill in the art would understand, in view of the disclosure, that the MIRPR 900 may include a similar internal receiver component as discussed with respect to FIG. 1.

In various embodiments, the MIRPR 900 may include an insulation chamber 960. Although shown as a single chamber, the insulation chamber 960 may be subdivided into multiple layers and/or multiple chambers, where each layer may contain a different insulation material or vacuum. Insulation materials may be any suitable such as Rockwool, aerogel, fiberglass, foam insulation, vermiculite, other insulation material, or a combination thereof. Further, given the extreme of temperature differential, any of the aforementioned insulation material may or may not be opacified, that is made opaque or otherwise none-transparent to thermal radiation. For example: opacified aerogel in a vacuum is an extremely effective insulation technique. One skilled in the art of vacuum insulation will know that effective vacuum insulation implementation often use multiple layer of reflective surfaces or walls within the vacuum to block infrared radiation, such as is done in cryogenic Dewars. Although shown as spherical in shape, a person of ordinary skill would appreciate that the exterior shape of the insulation chamber 960 may take on any other shape or form, without adversely impacting the effectiveness of the MIRPR 900.

The flow pattern of the heat transfer fluid in the MIRPR 900 is different than for the linear focus-designed receiver. In various embodiments of the MIRPR 900, the heat transfer fluid will flow into the MIRPR 900 through an inlet 905, flow around a first fluid tube 910, then trough a communication path 930 into a second fluid tube 920, flowing back around to an outlet 915. Though this illustration shows only two fluid tubes 910, 920, other embodiments may include more than two fluid tubes arranged in a row, which may incorporate one or more inlets 905 and/or one or more outlets 915. In various embodiments, turbulators (not shown) may be included within the two or more fluid tubes 910, 920, similar to the turbulators discussed above with respect to FIG. 7. In various embodiments, metal foam (not shown) may be included within the two or more fluid tubes 910, 920. Metal foam works differently than turbulators to accomplish fluid mixing and/or turbulence.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A multi-internal reflection vacuum less solar receiver (MIRVSR), comprising:
   an internal receiver component, comprising:
      a plurality of fluid tubes, each of the plurality of fluid tubes including at least one opening extending to an adjacent fluid tube configured to form a flow channel within the interior space of the plurality of fluid tubes, wherein the at least one opening is configured to allow fluid to pass between adjacent fluid tubes;
a plurality of internal deflectors disposed on a sunlight receiving side of the plurality of fluid tubes configured to redirect unabsorbed rays of sunlight such that the rays impact another location on the internal receiver component;
a set of sidewalls comprising a first sidewall and a second sidewall, an upper edge of each sidewall connected to a peripheral fluid tube of the plurality of fluid tubes; and
a selective coating disposed on the sunlight receiving side of the plurality of fluid tubes, the plurality of internal deflectors, and the set of sidewalls;
wherein the plurality of fluid tubes and the set of sidewalls define an internal cavity of the MIRVSR having an aperture; and
an insulation layer disposed above a non-receiving side of the internal receiver component, the insulation layer having an outer radius.

2. The MIRVSR of claim 1, wherein the plurality of fluid tubes, plurality of internal deflectors, and the first and second sidewalls may be manufactured by one of: extrusion; roll forming; welding; brazing; or a combination thereof.

3. The MIRVSR of claim 2, wherein the plurality of fluid tubes and the first and second sidewalls are manufactured as a single component.

4. The MIRVSR of claim 1, wherein each fluid tube of the plurality of fluid tubes comprises one or more of: steel alloy; stainless steel; copper; copper alloys; titanium; aluminum; or a combination thereof.

5. The MIRVSR of claim 1, wherein each fluid tube of the plurality of fluid tubes comprise a copper lining.

6. The MIRVSR of claim 1, wherein a first set of fluid tubes of the plurality of fluid tubes forms a first flow channel, and a second set of fluid tubes of the plurality of fluid tubes forms a second flow channel.

7. The MIRVSR of claim 1, wherein each fluid tube of the plurality of fluid tubes forms a flow channel.

8. The MIRVSR of claim 1, further comprising a set of turbulators disposed within each fluid tube of the plurality of fluid tubes.

9. The MIRVSR of claim 1, further comprising:
a first secondary reflector disposed on a first side of the aperture, an upper edge of the first secondary reflector connected to a bottom edge of the first side wall;
a second secondary reflector disposed on a second side of the aperture, an upper edge of the second secondary reflector connected to a bottom edge of the second side wall;
wherein the first secondary reflector and second secondary reflector are configured to direct sunlight into the internal cavity of the MIRVSR through the aperture.

10. The MIRVSR of claim 1, the insulation layer having a first end and a second end, further comprising a wing disposed on each of the first end and the second end of the insulation layer, each wing configured to block airflow across the aperture.

11. The MIRVSR of claim 1, further comprising an apex body disposed centrally below the aperture.

12. The MIRVSR of claim 1, further comprising an air gap between a top surface of the non-receiving side of the internal receiver component and the insulation layer.

13. The MIRVSR of claim 12, further comprising an intermediate surface disposed on a surface of the insulation layer facing the air gap.

14. The MIRVSR of claim 13, wherein the intermediate surface comprises a different material than the insulation layer, the intermediate surface comprising one of: aluminum; steel; stainless steel; plastic; or composite.

15. The MIRVSR of claim 1, further comprising a glass plate extending across the aperture from the bottom edge of the first side wall to the bottom edge of the second wall, wherein the glass plate encloses the interior cavity of the MIRVSR to prevent the free flow of air in and out of the internal cavity while allowing sunlight to enter the internal cavity and impact the sunlight receiving side of the internal receiving component.

16. The MIRVSR of claim 1, further comprising one or more photovoltaic arrays disposed on an outer surface of the insulation layer and configured to absorb direct sunlight.

17. The MIRVSR of claim 16, wherein the one or more photovoltaic arrays comprise one or more photovoltaic cells that are flexible and disposed along the outer radius of the insulation layer.

18. A MIRVSR, comprising:
an internal receiver component, comprising:
a plurality of fluid tubes forming a flow channel, each of the plurality of fluid tubes including at least one opening extending to an adjacent fluid tube to form a flow channel within the interior space of the plurality of fluid tubes, wherein the at least one opening is configured to allow fluid to pass between adjacent fluid tubes;
a plurality of internal deflectors disposed on a sunlight receiving side of the plurality of fluid tubes configured to redirect unabsorbed rays of sunlight such that the rays impact another location on the internal receiver component;
a set of sidewalls, an upper edge of each side wall connected to a peripheral fluid tube of the plurality of fluid tubes; and
a selective coating disposed on the sunlight receiving side of the plurality of fluid tubes, the plurality of internal deflectors, and the set of sidewalls;
wherein the plurality of fluid tubes and the set of sidewalls define an internal cavity of the MIRVSR having an aperture;
an insulation layer disposed above a non-receiving side of the internal receiver component, the insulation layer having a first end and a second end;
a first secondary reflector disposed on a first side of the aperture, an upper edge of the first secondary reflector connected to a bottom edge of the first side wall, a second secondary reflector disposed on a second side of the aperture, an upper edge of the second secondary reflector connected a bottom edge of the second side wall, wherein the first secondary reflector and second secondary reflector are configured to direct sunlight into the internal cavity of the MIRVSR through the aperture;
a wing disposed on each of the first end and the second end of the insulation layer, each wing configured to block airflow across the aperture; and
an apex body disposed centrally in front of the aperture.

* * * * *